(12) United States Patent
Carlson et al.

(10) Patent No.: US 6,223,463 B1
(45) Date of Patent: May 1, 2001

(54) INSECT BARRIER SYSTEM FOR PREVENTION OF THE PASSAGE OF CRAWLING INSECTS

(75) Inventors: David A. Carlson; Christopher J. Geden, both of Gainesville, FL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/216,513

(22) Filed: Dec. 18, 1998

(51) Int. Cl.[7] .................................................. A01G 13/10
(52) U.S. Cl. ............................. 43/108; 47/24; 52/101
(58) Field of Search .................... 43/108, 121; 47/23, 47/24; 52/101

(56) References Cited

U.S. PATENT DOCUMENTS

| | | | |
|---|---|---|---|
| 107,960 | * 10/1870 | Prindle | 47/24 |
| 203,898 | * 5/1878 | Doak | 47/23 |
| 642,064 | * 1/1900 | Bailey | 47/23 |
| 1,335,845 | 4/1920 | Long | 43/108 |
| 3,333,361 | * 8/1967 | Manak | 47/23 |
| 4,319,423 | 3/1982 | Judd | 43/121 |
| 4,471,562 | * 9/1984 | Brucker | 47/24 |
| 4,603,517 | 8/1986 | Lyons, Jr. | 52/60 |
| 4,756,116 | 7/1988 | Cutter | 43/108 |
| 4,766,695 | * 8/1988 | Harlow | 47/24 |
| 4,800,671 | * 1/1989 | Olson | 43/108 |
| 4,932,171 | 6/1990 | Beattie | 52/58 |
| 4,951,431 | 8/1990 | Sweers | 52/58 |
| 5,022,179 | * 6/1991 | Olson | 43/114 |
| 5,148,626 | 9/1992 | Haake, Sr. | 43/121 |
| 5,287,648 | 2/1994 | Hand et al. | 43/121 |
| 5,381,632 | 1/1995 | Damron | 52/58 |
| 5,392,559 | 2/1995 | Long | 43/121 |
| 5,414,954 | 5/1995 | Long | 43/121 |
| 5,417,017 | 5/1995 | Toutountzis | 52/101 |
| 5,561,941 | 10/1996 | Long | 43/121 |
| 5,566,500 | 10/1996 | Long | 43/121 |
| 5,649,385 | * 7/1997 | Acevedo | 43/114 |
| 6,108,968 | * 8/2000 | Peng | 43/108 |

FOREIGN PATENT DOCUMENTS

| | | | | |
|---|---|---|---|---|
| 459672 | * 12/1991 | (EP) | | 47/30 |
| 1083999 | * 4/1984 | (SU) | | 47/24 |
| WO 87/01904 | * 4/1984 | (WO) | | 47/23 |

* cited by examiner

*Primary Examiner*—Darren W. Ark
(74) *Attorney, Agent, or Firm*—M. Howard Silverstein; John D. Fado; G. Byron Stover (57) ABSTRACT

The system and method for preventing the passage of crawling insects upon the exterior surface of an object includes a member having an inner surface, adapted to be disposed adjacent to the exterior surface of the object, an opposed outer surface that has a low coefficient of friction for preventing the insects from traversing the outer surface since the crawling insects are unable to obtain sufficient traction with the outer surface of the member, a means for affixing the member to the exterior surface of the object so that the insects are forced to attempt to traverse the outer surface of the member in order to reach the exterior surface of the object above the member.

12 Claims, 4 Drawing Sheets

INSECT BARRIER SYSTEM FOR PREVENTION OF THE PASSAGE OF CRAWLING INSECTS

BACKGROUND OF THE INVENTION

1. Field of the Invention

The invention relates to a method and system for preventing crawling insects from entering, for example, residential structures, commercial structures, industrial structures, other structures inhabited or occupied by people and/or animals, or simple objects such as a tree. More particularly, the invention relates to a method and a system that provides a non-toxic physical barrier having the capability of preventing the passage of crawling insects past the barrier and of confining the crawling insects within a given enclosure.

2. Description of the Prior Art

Crawling insects constitute a serious problem in various areas such as agricultural plots and other environments such as plant nurseries and animal nurseries. The problem becomes even more intense where the crawling insect population may be very dense due to the nature of the environment, the density being as high as thousands of specimens per square meter. Such crawling insects pose a particular threat to the poultry business as the environment of a poultry house is particularly conducive to the breeding of harmful crawling insects.

The darkling beetle, commonly referred to as the lesser mealworm, and the hide beetle pose the most direct threat to poultry houses. The lesser mealworm has few natural enemies and each adult female may produce up to 2000 eggs with a new generation being produced each month. The rapid reproduction rate in combination with the untreated litter and manure within the poultry house allows populations of the beetle larvae and adults to become so high that the litter appears to be alive with crawling insects. Poultry house temperatures, reuse of litter, easy access of feed, and short turnaround times between flocks of chickens all provide ideal environmental conditions for lesser mealworm populations to get out of hand in modern production facilities.

The damage that such crawling insects can do is serious. They may endanger the structural integrity of building structures that are mounted on support and associated structures connected to the ground. Support and associated structures include, for example, foundation walls surrounding either a crawl space or a basement, external veneer or fascia, perimeter pier construction with or without an external veneer, interior piers or posts supporting the weight of the specific structure, and concrete slabs with wood frame construction. Furthermore, such crawling insects may cause damage to the interior walls or insulation of the structures due to their burrowing activities.

The economic impact of the darkling and hide beetles on the poultry business is, as expected, considerable. In addition to the damage to the structural integrity of the poultry house caused by the boring of the insects into the supporting structure of the poultry house, the insects burrow into and damage poultry house insulation which causes a significant reduction in available insulation and resultantly significantly higher fuel usage for temperature control of the house. Typically, a new poultry house will show substantial and visible damage after just one cycle of birds which is a universal problem in modern caged-layer and pullet houses.

Further, the migration of lesser mealworms into the cage area of enclosed broiler and layer poultry houses via the structure of the house allows for the consumption of the beetle larvae by chicks or poults which may result in decreased weight gain and reduced feed efficiency. Still further, consumption of the lesser mealworm and the enteric bacteria that are present in the migrating larva form of the lesser mealworm may transmit many costly poultry diseases to the enclosed birds.

At the present time, most structures that are mounted on support and associated structures utilize highly toxic poisons to prevent crawling insects from reaching the structures. This is also true in the poultry industry. While frequent and thorough cleaning of the poultry house may lower lesser mealworm numbers, this is difficult to accomplish in many areas due to limited litter disposal sites and expense. Similarly, freezing temperatures will also help to reduce or eliminate populations of lesser mealworms, but with rapid turn-around times between flocks this is not a reliable method of control. Morever, temperatures in many regions rarely reach freezing for a sufficiently long time to have an impact on beetle populations. Therefore, the previously accepted practical solution for control of darkling and hide beetles, or other crawling insects, has been the extensive use of pesticides, such as chlorpyriphos or cyfluthrin, in the poultry house.

However, pesticide treatment for control of the darkling and hide beetles and associated crawling insects is impractical. The timing of the application of the pesticide is critical as the poultry house litter has a high pH and pesticides tend to have a short effective life at high pH, as short as a day. Also, the darkling and hide beetles do not remain in the upper layers of the litter for more than a few days after a flock is removed from the house and, since the pesticide is normally applied when the chickens are not present in the house, it is difficult to bring the darkling and hide beetles into contact with pesticide while the pesticide is still effective. Due to the time limitations of the effectiveness of the pesticide, the user or a contracted service must periodically replace the pesticide in order to continue to preclude the unwanted intrusion of the crawling insects into the structure. Additionally, if the areas surrounding the house or the nearby fields are infested, the house will soon become reinfested.

Pesticide control of crawling insects, and particularly darkling and hide beetles, has another serious limitation as the use of pesticides eliminates crawling insects that might have a beneficial purpose in the specific environment. For example, the darkling and hide beetles have a beneficial function in a poultry house as the insects loosen and aerate manure in the litter, thus reducing housefly breeding in large numbers which otherwise could pose a health and nuisance threat to human and animal populations near the poultry house.

The herein invention, exemplary forms of which are described in detail hereinafter, has been originated to overcome the deficiencies inherent in the prior art and to provide an insect barrier system having the capability of preventing crawling insects from having access to materials that they would otherwise destroy.

SUMMARY OF THE INVENTION

The present invention results from the experimental discovery that crawling insects, such as darkling and hide beetles, cannot traverse a surface having a coefficient of friction less than about 0.45 $\mu$. The present invention is directed to an insect barrier system mounted above ground on support or associated objects for preventing the crawling insects from reaching the regions of the support or associated objects above the mounted insect barrier system and to a method for installing the insect barrier system.

Therefore, it is an object of the present invention to provide a mechanical insect barrier system mounted above ground on support and/or associated structures. The insect barrier system has physical barriers, such as a member that can extend along running lengths of the support structure (for example, the interior and/or exterior periphery of the foundation walls of a building) or around the circumference of objects, such as interior posts of a building, or a shield that can extend around the circumference of objects, such as interior posts of a building. The physical barriers have an outer surface that has a coefficient of friction less than about 0.45 $\mu$ for preventing crawling insects, such as darkling and hide beetles, from reaching critical areas of the structures above the insect barrier system, thereby minimizing structural damage to the structure, and for confining the insects within a given enclosure, thereby benefitting from the beneficial functions of the confined insects.

It is a further object of the present invention to provide unobtrusive members and/or shields that are relatively inexpensive, easy to install, quick to maintain, and environmentally safe, while having physical barriers with a coefficient of friction less than about 0.45 $\mu$ for preventing crawling insects, such as the larvae of the darkling and hide beetles, from reaching critical areas of the structures, thereby minimizing structural damage to the structure, and for confining the insects within a given enclosure, thereby benefitting from the beneficial functions of the confined insects.

It is a further objective of the present invention to provide relatively inexpensive, easy to install, quick to maintain, unobtrusive members and/or shields that are rugged and can maintain their insect precluding effectiveness for extended periods of time in harsh environments within the structure, the members and/or shields having physical barriers with a coefficient of friction less than about 0.45 $\mu$ for preventing crawling insects, such as darkling and hide beetles, from reaching critical areas of the structures, thereby minimizing structural damage to the structure, and for confining the insects within a given enclosure, thereby benefitting from the beneficial functions of the confined insects.

It is a further objective of the invention to utilize an adhesive to provide an impervious bond between the members and/or shields of the insect barrier system and the support and associated structures. The purpose of the adhesive is to obstructively seal off any spaces, between the members and/or shields of the insect barrier system and the support and associated structures, which would have permitted the crawling insects, including darkling and hide beetles, to bypass the invention and thereby gain access to the protected structure.

It is a further objective of the invention to provide an impervious obstruction between the members and/or shields of the insect barrier system and the support and associated structures. The purpose of the obstruction is to obstructively seal off any spaces, between the members and/or shields of the insect barrier system and the support and associated structures, which would have permitted the crawling insects, including darkling and hide beetles, to bypass the invention and thereby gain access to the protected structure.

It is also an object of the invention to provide an insect barrier system which may be utilitized on new construction, as a retrofit on existing structures, or as an integral portion of manufactured or modular structures at the time the structures are originally manufactured.

It is an additional object of the invention to provide an insect barrier system which may be utilized on any desired object in which it is desired to prevent crawling insects from gaining access to the portions of the object above the insect barrier system.

It is a further object of the invention to provide a collection structure for collecting crawling insects from a containment area for destruction of unneeded populations of the insects or for the gathering of beneficial insects.

Briefly, the present invention is directed to an insect barrier system for preventing insect intrusion across a physical insect barrier into the protected regions of an object. The insect barrier system comprises a member having an inner surface, adapted to be disposed adjacent to the exterior surface of the object, and an outer surface. The member is affixed to the exterior surface of the object so that the crawling insects are forced to attempt to traverse the outer surface of the member to reach the exterior surface of the object above the affixed member. Because the outer surface of the member has a low coefficient of friction, the insects cannot obtain sufficient traction with the outer surface and therefore cannot traverse the affixed member.

The insect barrier system of the present invention may also comprise a shield, which may be disposed above the member on a portion of the exterior surface of the object. The shield comprises a sleeve member adapted to circumscribe the periphery of the object, a projecting member, having an underside surface, an opposed topside surface, and an edge surface, extending outwardly from the sleeve member, and a means for affixing the sleeve member to the exterior surface of the object so that the insects are forced to attempt to traverse the underside surface, the edge surface, and the topside surface of the projecting member to reach the exterior surface of the object above the shield. Because the underside surface, the edge surface, and the topside surface of the projecting member have a low coefficient of friction which prevents the crawling insects from obtaining adequate traction, the crawling insects are prevented from reaching the protected regions of the object above the shield.

Moreover, the present invention relates to a method for installing an insect barrier system of the present invention onto an object or structure to prevent the intrusion of undesired insects into protected regions of the object or structure above the insect barrier comprising the step of affixing a member and/or a shield against the exterior surface of the object or structure so that the insects are forced to traverse the outer surface of the member and/or the underside surface, the edge surface, and the topside surface of the shield to reach the exterior surface of the object or structure above the insect barrier.

The above and other objects and advantages of the present invention will become more readily apparent when reference is made to the following description taken in conjunction with the accompanying drawings.

DETAILED DESCRIPTION OF THE PREFERRED EMBODIMENTS

The drawings disclose preferred embodiments of the present invention. The present invention is more particularly described in the following examples which are intended as illustrative only since numerous modifications and variations wherein will be apparent to those skilled in the art. As used in the specification and in the claims, "a" can mean one or more, depending on the context in which it is used. The preferred embodiments are discussed hereafter.

Figure 1:
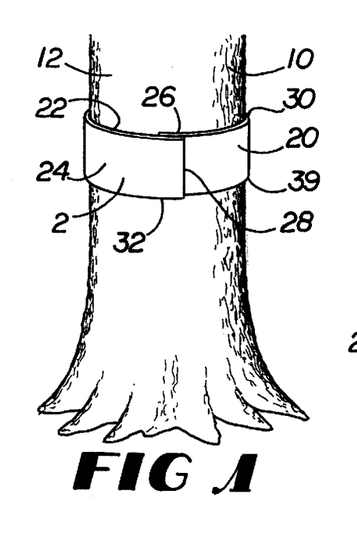
FIG. 1 is a pictorial view of a preferred embodiment of the present invention showing a member applied to and circumscribing a trunk of a tree.
Figure 2A:
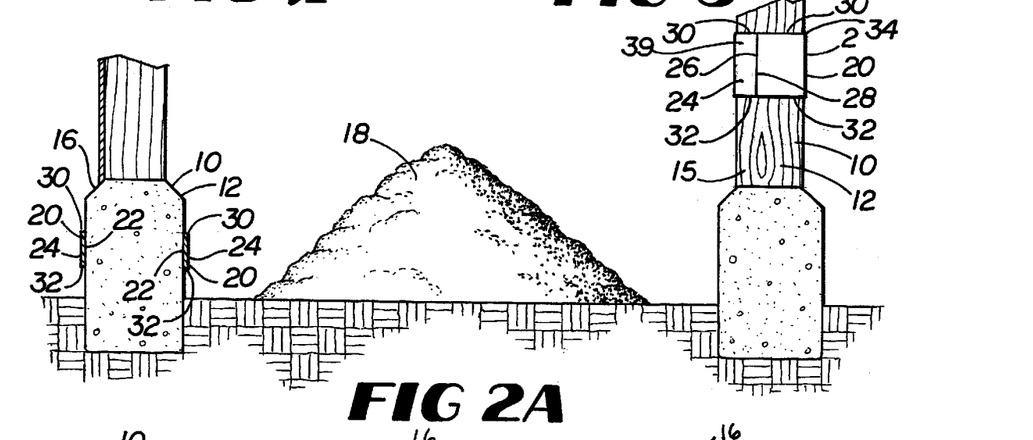
FIG. 2A is a cross-sectional view of a portion of a building structure showing a member applied to exterior and interior surfaces of a foundation wall and a member applied to and circumscribing an interior post of the building.

With reference to FIGS. 1 and 2A, a preferred embodiment of the insect barrier system of the present invention is thereshown for sealing one or more members 20 to the exterior surface 12 of an object 10 against the intrusion of crawling insects from below the member 20 to above the member 20. The member 20 has an inner surface 22 and an opposed outer surface 24. The inner surface 22 of the member 20 is affixed to the exterior surface 12 of the object 10 so that the crawling insects are forced to attempt to traverse the outer surface 24 of the member 20 to reach the exterior surface 12 of the object 10 above the member 20. The outer surface 24 of the member 20 has a low coefficient of friction, which prevents the crawling insects from adequately grasping the outer surface 24 of the member 20. Thus, due to insufficient traction with the outer surface 24 of the member 20, the insects cannot traverse the height of the member 20 to reach the exterior surface 12 of the object 10 above the member 20.

Preferably, the member 20 has the shape of an elongated strip that has a first end 26, an opposed second end 28, a top edge 30, and an opposed bottom edge 32 that is oriented toward the ground. The member 20 should have a minimum height (H) which is related to the largest size of the crawling insect that is desired to be excluded or contained. The height (H) of the member 20 should exceed the extended length of the largest crawling insect so that the insect cannot stretch across the width of the member 20 from the exterior surface 12 of the object 10 below the member 20 to the exterior surface 12 of the object 10 above the member 20. Any height greater than this minimum will work, however, to maintain a barrier having a relatively low profile, and to economize on material, about a one to six inch minimum has been found to be suitable for the embodiments shown in FIGS. 1 and 2A. Within these constraints, when the insect attempts to traverse the member 20 it is forced to either retreat or to drop to the ground below the member 20 and the protected portion of the object 10 because the low coefficient of friction of the outer surface 24 of the member 20 does not provide an adequate gripping structure for the insect.

It has also been determined that a range of coefficient of friction values ranging from about 0.05–0.45 $\mu$ for the outer surface 24 of the member 20 is optimum for the "slickness" of the insect barrier. Test criteria based on the coefficient of friction standard as outlined by the ASTM Test Method D-1894-95 has determined that if the outer surface 24 of the member 20 has a coefficient of friction greater than about 0.45 $\mu$, the crawling insects can obtain sufficient traction to grasp the member 20 and thereby traverse the insect barrier.

The insect barrier of the present invention may be formed by one or more connected members 20 joined together so that the outer surface 24 of the member 20, or members 20, is contiguous and the connected members 20 form a continuous barrier to the intrusion of the crawling insects along the length of the insect barrier. If more than one member 20 is required to form the insect barrier, the adjoining members 20 should be connected to each other in any manner known to one skilled in the art. Preferably, the first end 26 of one member 20 is in abutting engagement with the second end 28 of an adjoining member 20 when the members 20 are connected, or, alternatively, the first end 26 of one member 20 may overlap the second end 28 of an adjoining member 20 so that the respective adjacent first and second ends 26, 28 form an overlapping joint when the members 20 are connected. As will be appreciated by one skilled in the art and as shown in FIGS. 1 and 2A, if only one member 20 is required, such as a single member 20 being used to circumscribe the exterior surface 12 of the object 10 to form a collar 39, the first and second ends 26, 28 of that member 20 may also be connected in any manner known to one skilled in the art including either an abutting relationship or an overlapping relationship.

Figure 2B:
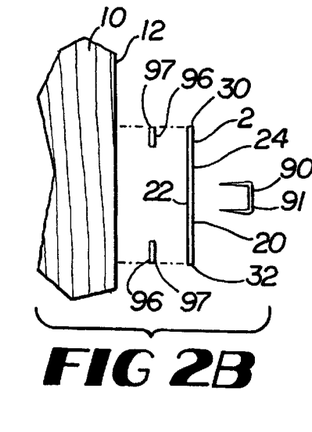
FIG. 2B is an exploded cross-sectional view showing a member of the present invention affixed to an object by the use of a conventional fastener and showing beads of a sealing agent between the inner surface of the member and the exterior surface of the object.
Figure 2C:
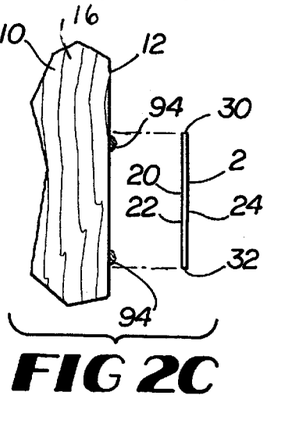
FIG. 2C is an exploded cross-sectional view showing a member of the present invention affixed to an object by the use of a adhesive and showing beads of an adhesive agent between the inner surface of the member and the exterior surface of the object.
Figure 2D:
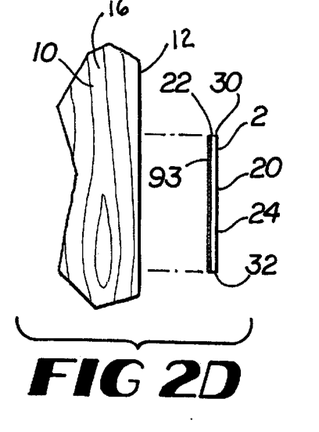
FIG. 2D is an exploded cross-sectional view showing a member of the present invention affixed to an object by the use of a adhesive and showing a layer of adhesive on the inner surface of the member.

Referring now to FIGS. 1–2D, the member 20 is preferably shaped to complementarily engage the exterior surface 12 of the object 10 so that the inner surface 22 of the member 20 closely overlies the exterior surface 12 of the object 10 when the member 20 is affixed to the object 10. Alternatively, the inner surface 22 may abut and be flush with the exterior surface 12 of the object 10 when the member 20 is affixed to the object 10. It is desired that the inner surface 22 of the member 20 be in relatively close cooperation with the exterior surface 12 of the object 10 to minimize any unwanted space that may exist between the inner surface 22 of the member 20 and the exterior surface 12 of the object 10, which would allow the insects to pass underneath the inner surface 22 of the member 20 to reach the exterior surface 12 of the object 10 above the member 20. Placing the inner surface 22 of the member 20 in relatively close cooperation with the exterior surface 12 of the object 10 also allows for the ready sealing, if desired, of the area between the inner surface 22 of the member 20 and the object 10 to force the insects to attempt to traverse the exterior surface 12 of the member 20.

Figures 4A, 4B, 5:
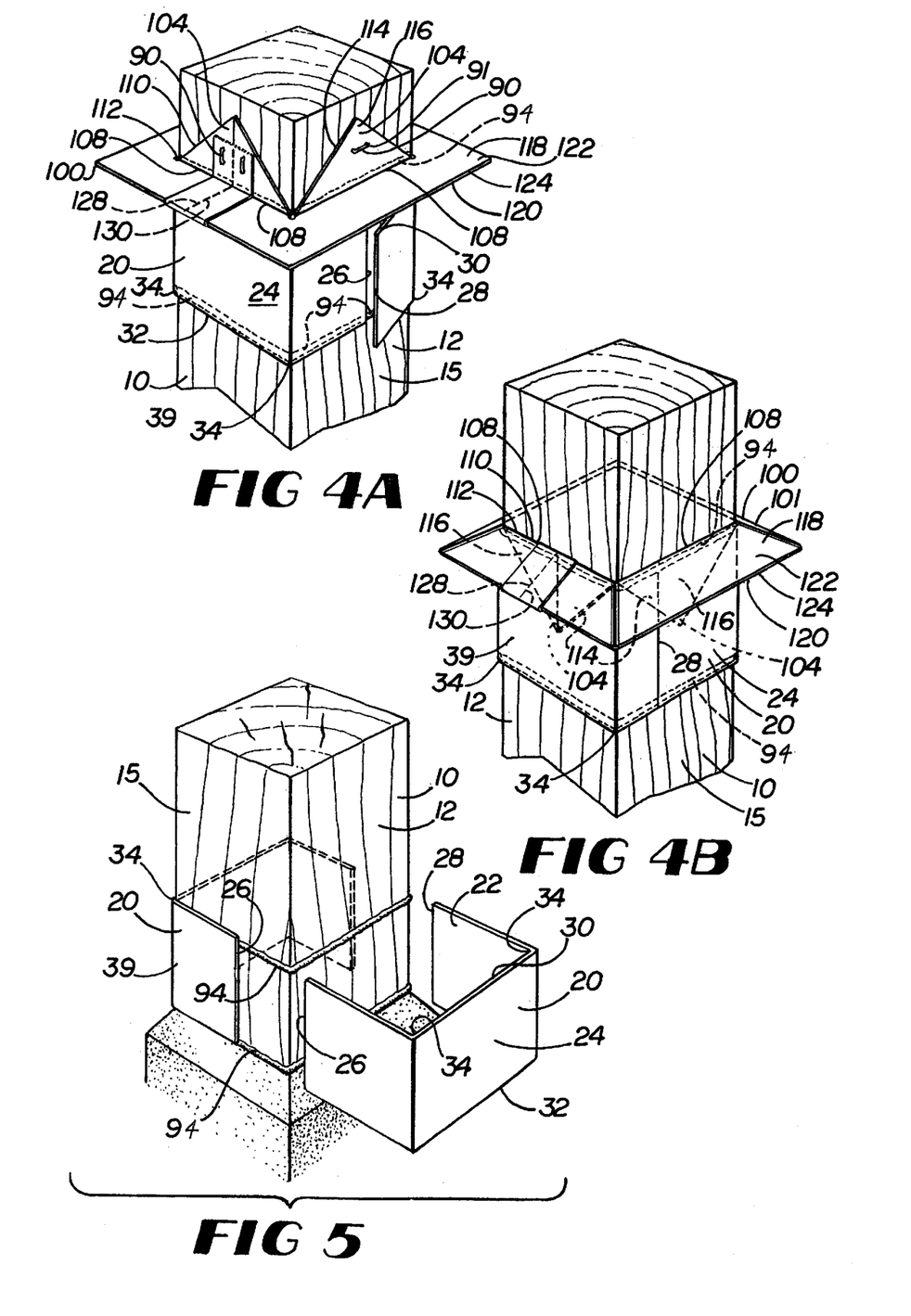
FIG. 4A is a perspective view of an embodiment of the present invention showing a member affixed to and circumscribing a rectangular post and showing a first embodiment of a shield disposed above the member and affixed to and circumscribing the post.
FIG. 4B is a perspective view of an embodiment of the present invention showing a first embodiment of a shield affixed to and circumscribing a rectangular post and showing a member affixed to and circumscribing the post and overlapping the sleeve members of the shield.
FIG. 5 is an exploded perspective view of an embodiment of the present invention showing two U-shaped members affixed to and circumscribing the exterior surface of a post.

For example, in an embodiment shown in FIGS. 2A, 4A, 4B and 5, the member 20 is shown attached to the exterior surface 12 of a rectangular interior post 15 of a building (the object 10 in this example) to prevent the crawling insects from reaching the upper reaches of the building structures by climbing the interior post 15. The member 20 circumscribes the post 15 to form a collar 39 that prevents the passage of insects at any point along the collar 39. Referring now to FIGS. 4A, 4B and 5, to facilitate shaping the member 20 so that the inner surface 22 of the member 20 closely overlies the exterior surface 12 of the post, it is preferred that the member 20 have a plurality of scores 34 spaced from the top edge 30 of the member 20 to the bottom edge 32 of the member 20. The inclusion of the scores 34 on the inner surface 22 of the member 20 allows the member 20 to be readily moved to a desired shape that is complementary to the shape of the exterior surface 12 of the post 15.

Referring to FIGS. 4A, and 4B, the four scores 34 spaced on the inner surface 22 of the member 20 of this embodiment allow one member 20 to be easily bent into a rectangular shape that is complementary to the exterior of the rectangular post 15 and further allows for the member 20 to circumscribe the post 15 to form the insect barrier. Alternatively, as shown in FIG. 5, the two scores 34 on the inner surface 22 of the member 20 of this embodiment allow the member 20 to be easily bent into a U-shape that is complementary to the exterior surface of the post 15. As would be readily appreciated by one skilled in the art, the combination of two U-shaped members 20 would allow the post 15 to be circumscribed by the members 20. In either embodiment, the respective first and second ends 26, 28 of the member 20, or members 20, are preferably connected in either the abutting or overlapping manner as described above, or in any other conventional manner known to one skilled in the art.

The member 20 may be formed from any conventional material including, for example, a sheet metal, or combinations of materials, such as a metal or polymer substrate having a polymer surface bonded to the substrate to form the outer surface 24 of the member 20 (for example, a sheet of polyvinyl chloride grafted onto another polymer base). The only constraint on the material choice is that the outer surface 24 of the member 20 should have a coefficient of friction of about 0.45 $\mu$ or less. Preferably, the member 20 should be flexible or ductile enough to allow for the shaping of the member 20 so that the inner surface 22 of the member 20 may be brought into the desired close cooperation with the exterior surface 12 of the object 10. This flexibility facilitates installation, particularly if the member 20 is to be installed on a curved or irregular surface, such as around posts or poles of various geometric cross-sections. This flexibility also enables the member 20 to packaged, transported and merchandised in a conventional rolled form. Any desired length of the member 20 may be cut from the roll.

For ease of handling and cost factors, it is preferred that the member 20 be formed from an extruded piece of a polymerized strip. An example of some preferred polymer materials include either a polyester material or a polyolefin material. More particularly, it is preferred that the selected plastic material be either a polyethylene terephthalate, polyvinyl chloride, polyethylene, or polypropylene. The member 20 may also be formed by a polyethylene terephthalate, polyvinyl chloride, polyethylene, or polypropylene layer being grafted onto a polymer substrate, or another suitable substrate, to form an outer surface 24 of the member 20 having the requisite low coefficient of friction.

The member 20 may be affixed to the object 10 by any means known to one skilled in the art, such as with conventional fasteners 90, chemical adhesives or heat bonding the member 20 to the exterior surface 12 of the object 10. The means for affixing the member 20 to the exterior surface 12 of the object 10 should insure that the inner surface 22 of the member 20 is obstructively sealed against the exterior surface 12 of the object 10. This obstructive seal ensures that the crawling insects cannot traverse the exterior surface 12 of the object 10 underneath the inner surface 22 of the member 20 in order to reach the portions of the object 10 above the member 20. Thus, the crawling insects are forced to attempt to traverse the outer surface 24 of the member 20 in their efforts to reach the protected portions of the object 10 above the member 20.

A use of a conventional fastener 90 is illustrated in FIG. 2B for affixing the member 20 to the exterior surface 12 of the object 10. Here, for example, a staple 91 is shown. However, it is envisioned that other types of fasteners 90, for example nails, brads, screws, or tacks, known to one skilled in the art may be effectively employed. This fastener 90 may cause the inner surface 22 of the member 20 to be forced into a tight abutting engagement with the exterior surface 12 of the object 10 that results in an adequate obstructive seal between the inner surface 22 of the member 20 and the exterior surface 12 of the object 10 to preclude the passage of the crawling insects underneath the affixed member 20. However, as shown in FIG. 2B, to ensure an adequate obstructive seal when a conventional fastener 90 is used to affix the member 20, it is preferred that one or more sealing strips 96 or one or more beads of sealing agent 97 be disposed intermediate the inner surface 22 of the member 20 and the exterior surface 12 of the object 10 extending along the length of the member 20. Thus, when the conventional fastener 90 is driven through the member 20 into the exterior surface 12 of the object 10 to affix the member 20 to the object 10, the sealing strip 96 or sealing agent 97 is compressed between the inner surface 22 of the member 20 and the exterior surface 12 of the object 10. This adequately seals the member 20 against the object 10 and obstructs the passage of the crawling insects on the exterior surface 12 of the object 10 underneath the affixed member 20.

The sealing strip 96 is a physical barrier affixed to the inner surface 22 of the member 20. Preferably, the sealing strip 96 is a dense flexible polymer strip having an adhesive strip on its upper side [not shown] for adhesively securing the sealing strip 96 to the inner surface 22 of the member 20. The compression of this dense sealing strip 96, by the conventional fastener 90, allows the sealing strip 96 to maintain an adequate obstructive seal, even if the object 10 is subject to shrinkage which would cause the exterior surface 12 of the object 10 to contract away from the inner surface 22 of the member 20. Upon contraction of the exterior surface 12 of the object 10, the dense sealing strip 96 correspondingly expands to maintain an adequate obstructive physical barrier to the passage of insects.

Similarly, if a sealing agent 97 is used to obstructively seal the area between the member 20 and the object 10, it is preferred that the sealing agent 97 be a flexible material, for example an acrylic or vinyl caulk or a putty, that allows for compression of the agent to form an adequate obstructive seal while also allowing the agent to stretch to maintain the formed obstructive seal if the underlying object 10 shrinks. There is no requirement that the sealing agent 97 have an adhesive quality.

Figure 3:
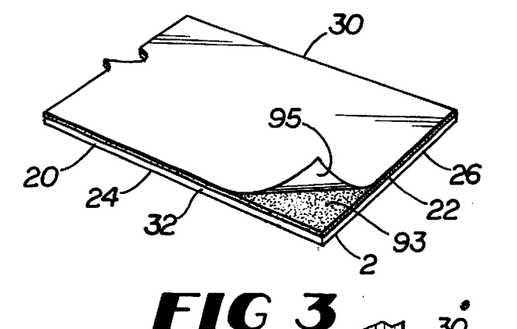
FIG. 3 is a perspective view of an embodiment of the present invention showing the layer of adhesive applied to the inner surface of the member and showing the release cover being removed from the layer of adhesive.

For economy, quality, and speed of application, the preferred means of affixing the member 20 to the object 10 is through the use of a chemical adhesive. Referring to FIG. 2D, a layer 93 of an adhesive may be included on the inner surface 22 of the member 20 for affixing the member 20 to the exterior surface 12 of the object 10. This adhesive may be a pressure sensitive adhesive. This layer 93 of adhesive provides an adequate obstructive seal between the inner surface 22 of the member 20 and the exterior surface 12 of the object 10 when the adhesive layer 93 of the member 20 is brought into adhesive contact with the exterior surface 12 of the object 10. Therefore, unless otherwise desired, there is no requirement to use the conventional fasteners 90, the sealing strip 96, or the sealing agent 97 since the adhesive acts to both affix the member 20 to the object 10 and to obstruct the passage of the crawling insects on the exterior surface 12 of the object 10 underneath the member 20. Referring now to FIG. 3, to protect and maintain the tackiness of the adhesive layer 93 before affixing the member 20 to the object 10, a release cover 95 may be releasably secured to the adhesive layer 93.

A further embodiment of the use of the preferred adhesive affixing means is shown in FIG. 2C. Here, at least one bead 94 of adhesive is interposed between a selected portion of the inner surface 22 of the member 20 and a selected portion of the exterior surface 12 of the object 10 to secure the member 20 to the exterior surface 12 of the object 10. The bead 94 of adhesive should extend the length of the member 20, or members 20 if more than one member 20 is used to form the insect barrier 2. This will ensure that an adequate obstructive seal is formed between the member 20 and the object 10 so that the insects are prohibited from obtaining passage underneath the inner surface 22 of the member 20 to reach the exterior surface 12 of the object 10 above the insect barrier. It is preferred that the adhesive be flexible and resilient to allow for compression of the bead 94 of adhesive to form an adequate seal and to provide sufficient stretching ability to maintain the formed obstructive seal if the underlying object 10 shrinks. Preferred adhesives are a vinyl or an acrylic latex adhesive. Examples of suitable adhesives that are commercially available include All-Purpose Adhesive Caulk made by Darworth Co., Simesbury Conn. Liquid Nails Adhesive, ICI MACCO, Cleveland Ohio; Dow Coming DAP® 100% silicone sealant made by DAP Inc., Dayton Ohio.

As noted above, there is no requirement to use a conventional fastener to affix the member 20 to the object 10 when an adhesive is used. However, as shown in FIG. 4B, the conventional fastener 90 may be used in combination with an adhesively affixed member 20 when desired. It may be desired, as shown in FIG. 4B, to use the conventional fastener 90 to hold the inner surface 22 of the member 20 in close cooperation with the exterior surface 12 of the object 10 until the adhesive cures or sets. The use of a conventional fastener to hold the member 20 in position also allows for the compression of the adhesive to help in forming an adequate obstructive seal while also allowing the adhesive to stretch or expand to maintain the formed obstructive seal if the underlying object 10 shrinks.

Figure 7A:
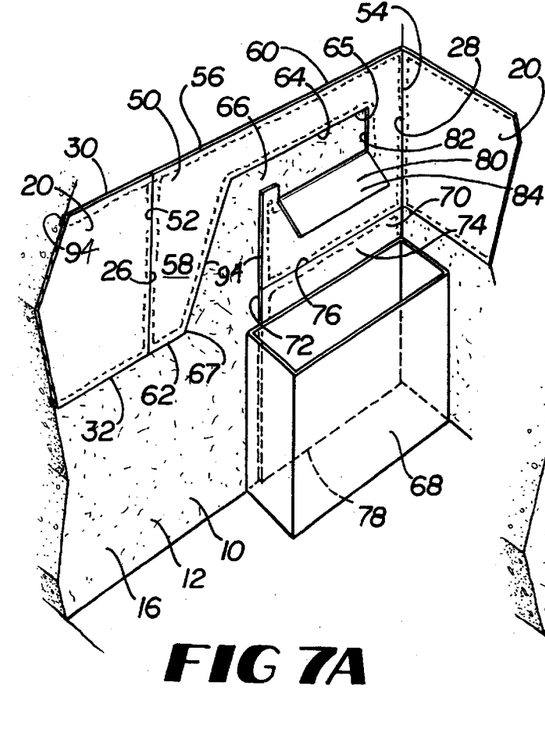
FIG. 7A is a perspective view showing a first embodiment of a collection means showing a collection body fixed to the exterior surface of an object and connected to adjoining members and showing a depository disposed below the top end of the passage within the collection body.
Figure 7B:
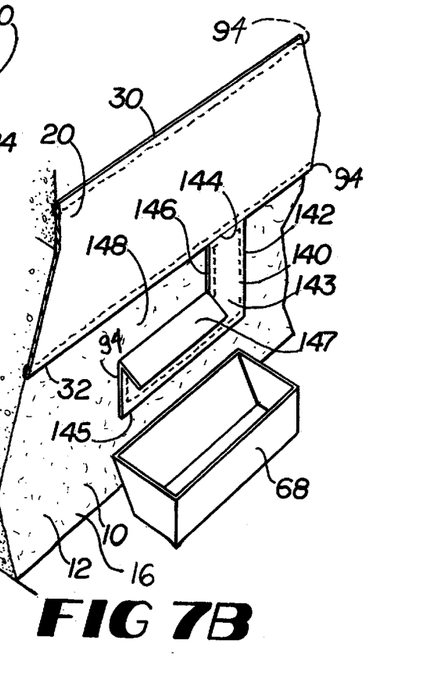
FIG. 7B is a perspective view showing a second embodiment of a collection means showing a "L" shaped collection strip fixed to the exterior surface of an object and connected to a member and showing a depository disposed below the defined passageway of the collection strip.
Figure 7C:
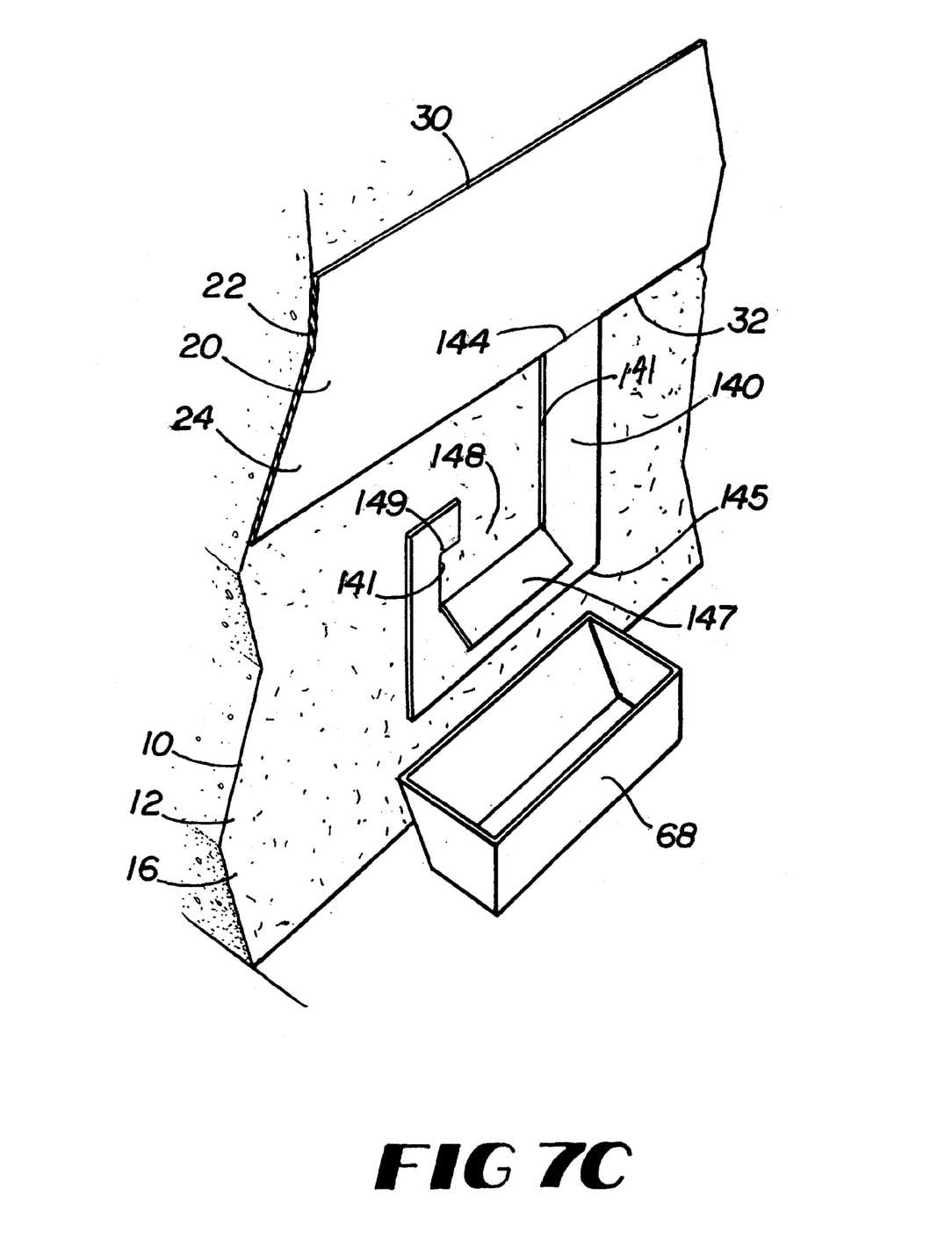
FIG. 7C is a perspective view showing a third embodiment of a collection means showing a "J" shaped collection strip fixed to the exterior surface of an object and connected to a member and showing a depository disposed below the defined passageway of the collection strip.

An alternative embodiment of the insect barrier system of the present invention may also include one or more collecting means. Each collecting means directs contained insects into a depository 68 for either disposal, if the population of the crawling insects requires reduction, or collection, if the beneficial insects are required for starting or maintaining a beneficial level of the insects in a different location. Referring now to FIGS. 7A–7C, a first, second, and a third embodiment of the collecting means are shown. In the first embodiment of the collecting means shown in FIG. 7A, a member 20 is connected to a collection body 50 for the gathering and disposal of excess crawling insects. The collection body 50 has a front end 52, an opposed back end 54, a body mounting surface 56 and an opposed body outer surface 58. It is preferred that the front end 52 of the collection body 50 be connected to the first end 26 of one member 20. Alternatively, if the collection body 50 is interposed between two members 20, it is preferred that the front end 52 of the collection body 50 be connected to the first end 26 of one member 20 and the back end 54 of the collection body 50 be connected to the second end 28 of a second, adjoining, member 20. The collection body 50 should be connected to the member 20, or members 20, by any means known to one skilled in the art, including forming an abutting or overlapping joint, so that the body outer surface 58 and the outer surfaces of the adjoining member 20(s) are contiguous. Thus, it is preferred that the height and width dimensions of the collection body 50 be substantially the same as the member 20 to aid in presenting a contiguous outer surface when the collection body 50 is connected to the member 20(s).

It is also preferred that the body mounting surface 56 be adapted to be disposed adjacent to the exterior surface 12 of the object 10. The preferred close cooperation of the body mounting surface 56 and the exterior surface 12 aids in providing the necessary obstructive seal between the body mounting surface 56 and the exterior surface 12 of the object 10 to prevent the unhindered passage of the crawling insects underneath the body mounting surface 56 when the collection body 50 is affixed to the object 10.

The body outer surface 58 has a low coefficient of friction for preventing the insects from traversing the body outer surface 58. As discussed above in regard to the member 20, the desired coefficient of friction is between about 0.05–0.45 $\mu$. To minimize cost and to simplify assembly of the insect barrier system, it is preferred that the collection body 50 be made from the same material as the member 20. This will ensure that the outer surfaces 24 of the members 20 and the body outer surface 58 of the collection body 50 has the same relative low coefficient of friction which the crawling insects are unable to grasp, hold, or grip to obtain sufficient purchase to traverse.

The collection body 50 further has a upper edge 60 and an opposed lower edge 62 that is oriented to face the ground. The collection body 50 defines a passage 64 that extends upwardly from and opening to the lower edge 62 of the collection body 50 to a closed top end within the interior of the collection body 50. When the collection body 50 is affixed to the object 10, the passage 64 defines a traversable path 66 that allows the crawling insects to crawl on the exposed exterior surface 12 of the object 10 so that the crawling insects are funneled toward the top end 65 of the passage 64. As would be apparent to one skilled in the art, any crawling insect that attempt to reach the exterior surface 12 of the object 10 by traversing the body outer surface 58 proximate the top end 65 of the passage 64 of the collection body 50 would fall from the collection body 50 due to the low coefficient of friction of the body outer surface 58. Any such falling insect would be collected in a depository 68, such as a bucket, disposed below the top end 65 of the passage 64. The depository 68 may also contain a toxicant or a drowning agent if it is desired to eradicate any crawling insects that fall within the depository 68.

The collection body 50 may be affixed to the exterior surface 12 of the object 10 by any affixing means known in the art so that the insects are forced to attempt to traverse the body outer surface 58 of the collection body 50 if the insect attempt to traverse the collection body 50. These affixing means include the affixing means described for the member 20 above, including the preferred affixing means, the use of an adhesive. If desired, the sealing strip 96 or the sealing agent 97 described for the member 20 above may also be used intermediate the body mounting surface 56 and the exterior surface 12 of the object 10 to ensure an adequate obstructive seal between the collection body 50 and the object 10.

As shown in FIG. 7A, the collecting means may also have a blocking member 70 connected to the lower edge 62 of the collection body 50. The blocking member 70 has a blocking member mounting surface 72, an opposed blocking member outer surface 74, a blocking member top edge 76 and an opposed blocking member bottom edge 78. The blocking member 70 is preferably made of the same material as the collection body 50. The blocking member outer surface 74 of the blocking member 70 also preferably has a low coefficient of friction for precluding the crawling insects from adequate grasping of the blocking member outer surface 74. The blocking member 70 and the collection body 50 of the first embodiment of the collecting means may be formed from separate components or they may be formed as a unitary unit.

The blocking member 70 is preferably sized so that the blocking member top edge 76 may be connected to the lower edge 62 of the collection body 50 and the blocking member bottom edge 78 may be in contact with the ground. It is preferred that the blocking member top edge 76 and the lower edge 62 of the collection body 50 form an abutting joint when connected. However, the blocking member top edge and the lower edge 62 of the collection body 50 may also form an overlapping joint when connected (as one skilled in the art will appreciate, using such an overlapping joint allows for flexibility in the size of the blocking member 70). Additionally, it is preferred that the blocking member 70 be joined to the collection body 50 near the passage opening 67 of the collection body 50 so that the crawling insects are directed toward the passage 64 of the collection body 50.

When the blocking member 70 is joined to the collection body 50 as described, the crawling insects contained below the member 20 and the collection body 50 of the insect barrier 2 are prompted to enter the passage opening 67 and traverse the path 66 since movement of the crawling insects along the exterior surface 12 of the object 10 below the member 20 and the collection body 50 is blocked by the blocking member 70 extending in a continuous length from the lower edge 62 of the collection body 50 to the ground. Thus, the insects may either enter the passage opening 67 on the path 66 within the collection body 50 or they can continue to try to traverse the body outer surface 58 of the collection body 50 or the outer surface 24 of the member 20.

The blocking member 70 may be affixed to the exterior surface 12 of the object 10 by any affixing means known in the art. These affixing means include the preferred affixing means described for the member 20 above. If desired, the sealing strip 96 or the sealing agent 97 described for the member 20 above may also be used intermediate the blocking member mounting surface 72 and the exterior surface 12 of the object 10 to ensure an adequate obstructive seal between the blocking body and the object 10.

The collection body 50 may also have a projecting platform 80 to help direct the insects that fall from the top end 65 of the collection body 50 into the depository 68. As shown in FIG. 7A, spaced slits 82 are cut into the sides of the passage 64 below the top end of the passage 64, leaving an intermediate part in between the slits 82. This leaves a leaf 84 in between the slits 82 to form the projecting platform 80. The leaf 84 is bent outward and downward, preferably at an acute angle relative to the lower edge 62 of the collection body 50 so as to produce a configuration as shown in FIG. 7A, in which the projecting platform extends outwardly from the body outer surface 58 and is disposed below the top end 65 of the passage 64. The projecting platform 80, being derived from the collection body 50, has the same characteristic low coefficient of friction which prevents the crawling insect from obtaining a grip on the projecting platform 80. Thus, the preferred acute angular disposition of the projecting platform 80 makes an insect that falls onto the projecting platform 80 after failing to grasp the body outer surface 58 proximate the top end 65 of the passage 64 prone to slide on the "slick" projecting platform 80 into the depository 68 disposed below the top end 65 of the passage 64 and the projecting platform 80.

A second embodiment of the collection means is shown in FIG. 7B. Here, a collection strip 140, preferably having an "L" shape, is attached to the bottom edge 32 of the member 20 for directing crawling insects into the depository 68 of the collection means. The collection strip 140 has a strip mounting surface 142, an opposed strip outer surface 143, a strip upper edge 144 and an opposed strip lower edge 145. The collection strip 140 is preferably made of the same material as the member 20 described above and, thus the strip outer surface 143 has the requisite low coefficient of friction. A slit 146 is cut into the strip upper edge leaving a flange shaped flap 147. The flap 147 is bent outwardly, preferably at an acute angle relative to the strip lower edge so as to produce the configuration shown in FIG. 7B.

When the collection strip 140 is affixed to the object 10 and the strip upper edge 144 of the "L" shaped collection strip 140 is connected to the bottom edge 32 of a member 20 as shown in FIG. 7B, a traversable passageway 148 is defined that allows the crawling insects to crawl on the exposed exterior surface 12 of the object 10 between the bottom edge 32 of the member 20 and the flap 147 of the collection strip 140. As would be apparent to one skilled in the art, any crawling insect attempting to reach the exterior surface 12 of the object 10 by traversing the outer surface 24 of the member 20 above the flap 147 of the collection strip 140 would fall from the outer surface 24 of the member 20 onto the flap 147. Since the flap 147 is derived from the collection strip 140, it has the same characteristic low coefficient of friction that prevents the crawling insects from adequately grasping the surface of the flap 147. Thus, the preferred acute angular disposition of the flap 147 makes an insect that falls onto the flap 147 of the collection strip 140 slide from the flap 147 into a depository 68 that is disposed below the flap 147 of the collection strip 140.

A third embodiment of the collection means is shown in FIG. 7C. Here, the collection strip 140 described above has a "J" shape. Spaced cuts 141 are made into the strip upper edge 144 leaving a flange shaped flap 147. The flap 147 is bent outwardly, preferably at an acute angle relative to the strip lower edge so as to produce the configuration shown in FIG. 7C. When the flap 147 is bent outward, a planar tab 149 is defined which extends into the passageway 148 and above a select portion of the flap 147. In practice, the insects entering the defined traversable passage 148 tend to gather at the planar tab 149 and bump each other off the low coefficient surface of the planar tab 149. These crawling insects then fall onto the flap 147 and thence slide into the depository 68.

The collection strip 140 of the present invention may be affixed to the exterior surface 12 of the object 10 by any affixing means known in the art. These affixing means include the preferred affixing means described for the member 20 above.

Figure 6A:
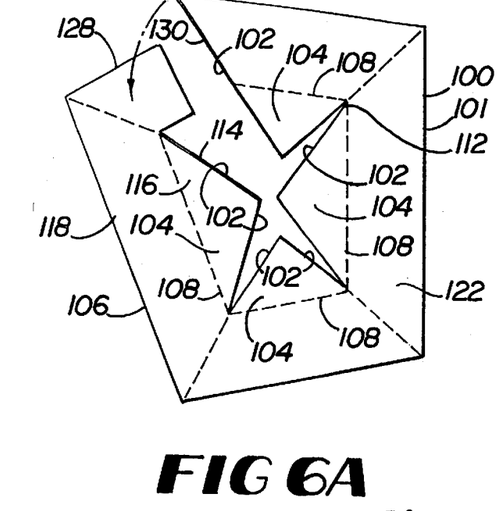
FIG. 6A is a top view of a second embodiment of the shield of the present invention.
Figure 6B:
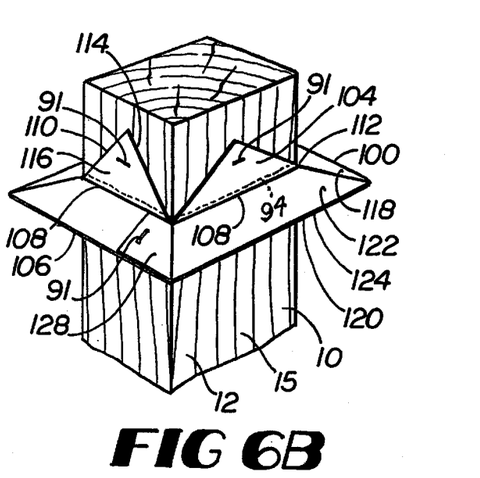
FIG. 6B is a perspective view of the shield of FIG. 6A affixed to and circumscribing a rectangular post.

Referring now to FIGS. 4A, 4B, 6A, and 6B, alternative embodiments of the insect barrier system of the present invention are shown. Here, a shield 100 is adapted to be disposed around an object 10 having a fixed periphery, such as an interior pier or post is having various geometric cross-sections. For example, in FIGS. 4A, 4B, and 6B, a shield 100 is shown disposed around a post having a rectangular cross-section. In FIGS. 4A and 4B, the shield 100 is shown in use with a member 20 disposed upon and circumscribing the object 10. It is preferred that the shield 100 be disposed above the member 20 on the object 10 when used in combination with the member 20. This aids in shielding the outer surface 24 of the member 20 from airborne particulate matter that may roughen the outer surface 24 of the member 20 beyond the acceptable coefficient of friction range. As one skilled in the art would appreciate however, and as shown in FIG. 6B, it is contemplated that the shield 100 embodiment is not required to be used in combination with a member 20.

Referring now to FIGS. 6A and 6B, the shield 100 is preferably initially formed from a sheet of material that is preferably the same type of material that forms the member 20. Spaced slits 102 are cut into the shield 100 from near the center of the sheet 101 toward the periphery 101 of the sheet leaving an intermediate part in between the slits 102. This leaves flange shaped sleeve members 104 in between the slits 102 in the shield 100. One of the slits 102 extends to the outer edge 106 of the sheet 101 to allow the shield 100 to be readily disposed around the fixed periphery of the object 10.

Each intermediate part in between the slits defines a traverse axis 108 along each sleeve member 20. When the sleeve members 104 are bent upwardly or downwardly about the transverse axis 108 of the respective sleeve members 104, a sleeve aperture 110 is defined that is bounded by the upwardly or downwardly extending sleeve members 104. The sleeve aperture 110 has an inside perimeter 112 that is complementarily sized and shaped to the fixed periphery of the object 10. The sleeve members 104 have an inside mounting surface 114 and an opposed sleeve outer surface 116. The inside mounting surface 114 of the sleeve member 20 is adapted to complementarily en gage the exterior surface 12 of the object 10.

When the sleeve members 104 are bent about the respective traverse axises 108, a projecting member 118 is defined from the portion of the shield 100 that extends beyond the end of the slits to the outer edge 106 of the sheet. The projecting member 118 has an underside surface 120, an opposed topside surface 122, and an edge surface 124. The projecting member 118 extends outwardly from the sleeve outer surface 116 and preferably extends at a right angle relative to the sleeve outer surface 116 so as to produce a configuration as shown in FIGS. 4A and 4B, or at an obtuse angle relative to the sleeve outer surface 116 so as to produce a configuration as shown in FIG. 6B. The underside surface 120, the edge surface 124, and the topside surface 122 of the projecting member 118 and the sleeve outer surface 116 of the sleeve member 20 have a low coefficient of friction, between about 0.05 and 0.45 $\mu$, so that the insects cannot traverse the shield 100.

The slit 102 that extends from near the center of the sheet 101 to the outer edge 106 of the sheet (the periphery 101 of the sheet) bisects the projecting member 118 and defines a first joining end 128 and an opposed second joining end 130 along the bisected portion of the projecting member 118. To assemble the shield 100 onto the object 10, the first and second joining ends 128, 130 of a formed shield 100 are first pulled apart and the sleeve aperture 110 of the shield 100 is then positioned around the fixed periphery of the object 10. The first and second joining ends 128, 130 are then drawn back together until the inside mounting surfaces 114 of the sleeve members 104 are brought into close operative cooperation with the exterior surface 12 of the object 10. The first and second joining ends 128, 130 are subsequently connected to each other to ensure the continuity of the projecting member 118 of the shield 100 and the sleeve members 104 are affixed to the exterior surface 12 of the object 10 so that the insects are forced to attempt to traverse the underside surface 120, the edge surface 124, and the topside surface 122 of the projecting member 118 to reach the exterior surface 12 of the object 10 above the shield 100.

As one skilled in the art will appreciate, the sleeve aperture 110 of the shield 100 may be positioned around the periphery of the object 10 so that the sleeve members 104 of the shield 100 are oriented upward toward the protected portions of the object 10, as shown in FIG. 4A, or, alternatively, downward toward the ground, as shown in FIG. 4B. Still referring to FIG. 4B, when the inside mounting surfaces 114 of the sleeve members 104 of the shield 100 are affixed to the exterior surface 12 of the object 10 so that the sleeve members 104 are oriented downward and when a member 20 is used in combination with the shield 100, it is preferred that the inner surface 22 of the member 20 overlaps the sleeve outer surface 116 of the downwardly extending sleeve members 104 when the member 20, or members 20, is affixed to the post 15. It is also preferred that the top edge 30 of the member 20 be positioned near the traverse axises 108 of the sleeve members 104 (the "L" shaped juncture of the sleeve members 104 and the projecting member 118 of the shield 100) so that a "unitary" barrier to the passage of insects is formed from the outer surface 24 of the member 20 and the underside surface 120, the edge surface 124, and the topside surface 122 of the projecting member 118 of the shield 100.

The first and second joining ends 128, 130 may be connected by any means known in the art. These means may include the use of conventional fasteners 90, such as a staple 91 driven through overlapping first and second joining ends 128, 130 to form an overlapping joint, the use of adhesives, such as an adhesive caulk interposed between overlapping first and second joining ends 128, 130 to form an overlapping joint, or the use of an adhesive tape over the abutting ends of the first and second joining ends 128,130 to form an abutting or overlapping joint. The shield 100 may be affixed to the exterior surface 12 of the object 10 by any means known to the art. These means include those preferred affixing means described above for affixing the member 20 to an object 10.

The insect barrier system may be disposed at any of a variety of surfaces of a variety of different objects 10 in any of a variety of configurations. Referring to FIGS. 1 and 2A, the insect barrier may be attached to simple objects 10, such as a tree, or it may be attached to support and associated structures connected to the ground in order to protect these structures and the building formed from these structures from intrusion of crawling insects. Support and associated structures include, for example, foundation walls surrounding either a crawl space, a basement, or an interior building space, external veneer or fascia, perimeter pier construction with or without an external veneer, interior piers or posts supporting the weight of the specific structure, concrete slabs with wood frame construction, building and roof structures, insulation within the building, or any other portion of a building or structure of a building that is desired to be protected. While not shown in the drawings, it can be understood that the invention as illustrated in FIGS. 1 and 2A, can be used on such objects 10 as the legs of lawn chairs and tables, the outside of buckets or other containers, the pedestals of outdoor grills, and the like almost without limit.

For example, referring to FIG. 2A, the insect barrier system of the present invention, which may include one or more members 20 joined together to form a continuous elongated strip, is shown arranged as an exterior band around the periphery of the foundation wall 16 of the building or structure. The member 20 is affixed to the foundation wall 16. This embodiment prevents the crawling insects from reaching the upper reaches of the building structures from infested grounds surrounding the building to be protected. The member 20 of this embodiment may be affixed to the exterior surface 12 of the foundation wall 16 using any means known to one skilled in the art, including the affixing means described above. However, as shown in FIGS. 2C and 2D, it is preferred that the member 20 be attached to the foundation wall 16 using either a layer 93 of adhesive applied to the inner surface 22 of the member 20 or one or more beads 94 of adhesive interposed between the inner surface 22 of the member 20 and the exterior surface 12 of the foundation wall 16.

A similar embodiment that is applied to the interior of the building is also shown in FIG. 2A. Here, one or more members 20 may be joined together to form an elongated strip arranged around the interior periphery of the foundation wall 16 of the building. This embodiment contains the crawling insects within a confinement area 18 defined by the elongated strip and prevents the crawling insects from reaching the upper reaches of the building structures from the containment area 18. The member 20 of this embodiment may be affixed to the foundation wall 16 using any means known to one skilled in the art including the affixing means described above. However, it is preferred that the member 20 be attached to the foundation wall 16 using either a layer 93 of adhesive applied to the inner surface 22 of the member 20 or one or more beads 94 of adhesive interposed between the inner surface 22 of the member 20 and the exterior surface 12 of the foundation wall 16. It is also preferred that the member 20 be attached to upper portions of the foundation wall 16 away from the ground to prevent or minimize contact of the member 20 with the ground. This minimizes the accumulation of soil or litter on the outer surface 24 of the member 20 that could inadvertently degrade the low coefficient of friction of the outer surface 24 of the member 20. Also, if desired to be used, the collecting means may be positioned anywhere along the interior periphery of the foundation in contact with one or more members 20.

As would be apparent to one skilled in the art, any combination of members 20 and/or shields 100 may be used to protect an object 10 from undesirable intrusion of crawling insects into those regions of the object 10 above the insect barrier system and to contain the crawling insects in those areas below the insect barrier system. It would also be apparent that any exterior surface 12 within a building, structure, or object 10, such as the foundation wall and the interior post shown in FIG. 2A, that could potentially provide a pathway for the crawling insects to reach the desired protected regions of the object 10 should have a member 20, a shield 100, or a combination of a member 20 and a shield 100 affixed to that surface.

Referring back to FIGS. 1 and 2A, a method of assembling the insect barrier system of the present invention is described for affixing one or more members 20, in the form of a continuous elongated strip, to an object 10 is described. First, after accurately measuring the dimensions of the object 10, a length of the member 20 that is sized to complementarily engage the exterior surface 12 of the object 10 is selected. The member 20 may be selected from various precut dimensioned members 20, but is preferably unrolled from a convolutely wound roll so that the desired length of the member 20 may be cut from the roll. The member 20 is then bent as required so that the inner surface 22 of the member 20 overlies and is in close cooperation with the exterior surface 12 of the object 10. Next, the member 20 is positioned against the desired portion of the exterior surface 12 of the object 10 and affixed to the object 10 so that the crawling insects are forced to traverse the outer surface 24 of the member 20 to reach the exterior surface 12 of the object 10 above the member 20.

To affix the member 20 to the object 10 alternative methods may be used. First, the member 20 may be secured to the object 10 by driving conventional fasteners 90 through the member 20 and into the object 10. If a chemical affixing means is used, which is preferred, one or more spaced beads 94 of a chemical adhesive are applied to a desired portion of the exterior surface 12 of the object 10, or to the desired portion of the inner surface 22 of the member 20, prior to positioning the member 20 against the exterior surface 12 of the object 10 to affix the member 20 and to form an obstructive seal between the inner surface 22 of the member 20 and the exterior surface 12 of the object 10 when the inner surface 22 of the member 20 is subsequently brought into binding contact with the beads 94 of adhesive.

Alternatively, a layer 93 of adhesive is applied to the inner surface 22 of the member 20 prior to positioning the member 20 against the exterior surface 12 of the object 10 to affix and to form an obstructive seal between the inner surface 22 of the member 20 and the exterior surface 12 of the object 10 when the layer 93 of adhesive is subsequently brought into contact with the exterior surface 12 of the object 10. However, if a release cover 95 is releasably secured to the layer 93 of adhesive present on the inner surface 22 of the member 20, the release cover 95 must be first be ruptured and removed to expose the layer 93 of adhesive. The now exposed layer 93 of adhesive is then positioned and affixed to the exterior surface 12 of the object 10 to form an obstructive seal between the member 20 and the object 10.

If an adhesive is used to affix the member 20 to the object 10, conventional fasteners 90 may be driven through the member 20 and into the object 10 to hold the member 20 in position until the adhesive has had adequate time to cure or to set. Alternatively, adhesive tape may be applied to the outer surface 24 of the member 20 to hold the member 20 in the desired position until the adhesive has time to cure or to set.

If desired to ensure an obstructing seal between the inner surface 22 of the member 20 and the exterior surface 12 of the object 10 when conventional fasteners 90 are used to affix the member 20 to the object 10, one or more beads of the sealing agent 97 or one or more sealing strips 96 may be placed between a desired portion of the exterior surface 12 of the object 10 and a desired portion of the exterior surface 12 of the object 10 prior to positioning the member 20 against the exterior surface 12 of the object 10. Alternatively, after the member 20 is secured to the object 10, one or more beads of the sealing agent 97 may be applied to the juncture of the top edge 30 of the member 20 and the object 10 and the juncture of the bottom edge 32 of the member 20 and the object 10 to obstructively seal the member 20 to the object 10.

Alternatively, if it is desired to be used in conjunction with a member 20 (or members 20) for gathering excess insects within the contained area, the collection body 50 should be assembled with the members 20. The method of applying the collection body 50 is similar to that used for securing the members 20 to an object 10. In the embodiment shown in FIG. 7A, spaced beads 94 of adhesive are first applied to the exterior surface 12 of two walls forming a corner. The inner surface 22 of the first member 20 is then positioned against the beads 94 of adhesive to obstructively seal the first member 20 to the first wall. Next, the back end 54 of the collection body 50 is seated into the corner formed by the two walls so that the opening 67 in the lower edge 62 of the collection body 50 faces the ground. The body mounting surface 56 is then placed into contact with the beads 94 of adhesive to obstructively seal the collection body 50 to the wall. As one skilled in the art would appreciate, the beads 94 of adhesive may also be applied to the inner surface 22 of the member 20 or to the body mounting surface 56 of the collection body 50.

To form a continuous barrier to the passage of the crawling insects, the front end 52 of the collection body 50 may be in abutting relationship with the first end 26 of the first member 20, as shown in FIG. 7A, or the front end 52 of the collection body 50 may overlap the first end 26 of the first member 20. The second end 28 of the second member 20 is then positioned into the corner in abutting relationship with the back end 54 of the collection body 50 and subsequently placed against the beads 94 of adhesive to obstructively seal the second member 20 to the second wall. Next, a depository 68 is positioned on the ground under the top end 65 of the passage 64 of the collection body 50 to catch any of the insects falling from the top end 65.

Similarly, if a blocking member 70 is desired to be used in combination with the collecting body, spaced beads 94 of adhesive are applied to the exterior of the wall and the blocking member mounting surface 72 is positioned against the beads 94 of adhesive to obstructively seal the blocking member 70 to the wall. To form a continuous barrier to the passage of the crawling insects, the blocking member top edge 76 may be in abutting relationship with the lower edge 62 of the collection body 50, as shown in FIG. 7A, or the blocking member top edge 76 may overlap the lower edge 62 of the collection body 50.

As would be apparent to one skilled in the art, the collection body 50 may be connected to two adjoining members 20, such as interposing the collection body 50 in a corner between two members 20 as described above or interposing the collection body 50 between two members 20 along the running length of a foundation wall 16, or object 10, or the collection body 50 may be connected to one member 20 if the collection body 50 is affixed to the end of the foundation wall 16, or object 10, thereby negating the necessity for a second member 20 to be connected to the collection body 50.

Alternatively, if it is desired to be used in conjunction with a member 20 gathering excess insects within the contained area, the collection strip 140 may be connected to the member 20. The method of applying the collection strip 140 is similar to that used for securing the members 20 to an object 10. In the embodiments shown in FIGS. 7B and 7C, spaced beads 94 of adhesive are first applied to the strip mounting surface 142. The strip mounting surface 142 is then positioned against the exterior surface 12 of the wall to obstructively seal the collection strip 140 to the walls. To form a continuous barrier to the passage of the crawling insects, the strip upper edge 144 of the collection strip 140 may be in abutting or overlapping relationship with the bottom edge 32 of the member 20. Next, a depository 68 is positioned on the ground under the collection strip 140 to catch any of the insects falling from the collection strip 140.

The following example is illustrative of the method of installing the insect barrier system of the present invention to an interior post 15 of a building. Referring to FIGS. 4A and 4B, a length of the member 20 is selected that is sized to circumscribe the periphery of the post 15. Next, the member 20 is shaped so that the inner surface 22 of the member 20 will complementarily engage or overlie the exterior surface 12 of the post. The member 20 may be bent along the scores 34 in the inner surface 22 of the member 20 to facilitate the shaping of the member 20. If the interior post is circular, the member 20 may simply be wrapped around the post and secured without bending the member 20 about the scores 34. In the examples illustrated in FIGS. 4A and 4B, beads 94 of adhesive are applied to the exterior surface 12 of the post to form continuous bands of adhesive circumscribing the post. Next, the shaped member 20 is drawn around the post to compress the adhesive in order to affix the member 20 to the post and to form an adequate obstructive seal between the member 20 and the post. Conventional fasteners 90, such as the staples 91 shown, may then be driven through the member 20 into the post to hold the member 20 to the post until the adhesive cures or sets. Additional adhesive may be applied between the interior corners formed in the member 20 and the exterior surface 12 corners of the interior post 15 to further enhance the obstructive seal between the member 20 and the post 15. Alternatively, the adhesive or the sealing agent 97 may be applied to the top edge 30 and the bottom edge 32 of the circumscribing member 20 after the member 20 has been affixed to the post 15 using the conventional fasteners 90.

The following example is illustrative of the method of applying a shield 100 to a rectangular post 15. Referring to FIGS. 6A and 6B, a sheet of material having a low coefficient of friction is selected. Next the shield 100 is formed by cutting slits 102 in the sheet 101 radiating from near the center of the sheet 101 toward the outer edge 106 of the sheet 101 and one slit 102 in the sheet 101 from near the center to the outer edge 106 of the sheet 101 forming flange sleeve members 104. The flange sleeve members 104 are then bent upwardly about the traverse axises 108 of the sleeve members 104 so that the inside mounting surfaces 114 of the sleeve members 104 will complementarily engage the exterior surface 12 of the post 15 when the shield 100 is disposed onto the post 15.

Next, a bead 94 of adhesive is applied to the exterior surface 12 of the post 15 to form a continuous band of adhesive circumscribing the post 15. The first and second joining ends 128, 130 of the formed shield 100 are then pulled apart and are brought around opposite sides of the post 15 so that the shield 100 circumscribes the post 15 and the inside mounting surfaces 114 of the sleeve members 104 are positioned opposite the adhesive. The first and second joining ends 128, 130 of the shield 100 are then drawn together to compress the adhesive to affix the shield 100 to the post 15 and to form the desired obstructive seal between the shield 100 and the post 15. Finally, conventional fasteners 90, such as the staples 91 shown, may then be used to hold the sleeve members 104 of the shield 100 to the post 15 until the adhesive cures and to connect the first and second joining ends 128, 130 in an overlapping joint (this is in contrast to the embodiment shown in FIGS. 4A and 4B, which uses adhesive tape to connect the first and second joining ends 128, 130 in an abutting joint).

EXAMPLES

In the Examples that follow, the insect barriers were applied to a pullet house of typical modem construction with five short interior walls (16 inches high) of poured concrete the length of the house (40 feet by 360 feet), with one hundred and two interior posts (4 inches by 6 inches). A single row of polystyrene foam panels (1 inch thick by 4 feet wide by 8 feet high) insulated the metal side walls, with chicken wire and plastic curtains continuing up to the roof. The rafters were connected by horizontally arranged wooden battens, covered with polystyrene foam panels (1½ inch thick by 4 feet wide by 8 feet high) with a metal roof.

Example I

In the first field trial, a polyethylene terepthalate resin film (PETG), 0.020 inches thick by 6 inches high, distributed by AIN Plastics, Tampa Fla., was used as the material to form the member 20 of the insect barrier system. To fix the PETG member to the inner periphery of the house, long strips of the PETG member were applied lengthwise from a convoluted roll to the top of the upstanding surface of the sixteen inch high cement interior retaining walls. The member was applied to the walls with double beads of adhesive caulking applied several inches apart. No other fastener was used. Some of the adhesive caulking was squeezed out from between the exterior surface of the wall and the inner surface of the member as the member was secured to the wall. This excess adhesive caulking formed a small bead at or near both the top and bottom edges of the PETG member.

In this and other similar experiments it was determined that neither larvae nor adult lesser mealworms or hide beetles could traverse the upstanding outer surface of the insect barrier. Hundreds of lesser mealworms and hide beetles were observed below the bottom edge of the member on the interior walls and the interior posts, but, with only a single exception, no lesser mealworms were observed on the protected interior walls or posts above the applied insect barrier system. The single exception was due to improperly applied caulking material which allowed a gap to form between the exterior surface of the post and the inner surface of the member. This gap was sufficient for the lesser mealworms to transit the exterior surface of the post (underneath the inner surface of the member) to the structure of the house.

The lesser mealworms and hide beetles, in either the larval or adult form, do not have hooks, sticky pads, or sticky surfaces that appear to allow them to negotiate the outer surface of the PETG member. It was also demonstrated in this Example that the insect barrier system retained its effectiveness, even upon the deposit of a thin surface layer of food dust and admixtures of splattered manure and fly specks upon the outer surface of the member. Thus, it appears that the insect barrier system of this Example successfully precluded the lesser mealworm and hide beetles from reaching the vulnerable support and associated structures and contained the crawling insects within the pullet house for beneficial reduction of fly populations.

The PETG member was robust enough to withstand rats and other wildlife indigenous to the pullet house environment. The PETG material is resilient, tough and very long lasting under reduced light. Furthermore, the latex caulk, usually advertised as a twenty to fifty year caulk (depending upon the brand and addition of silicone) should approximate the lifespan of the PETG member used in the trial.

Example II

In the second field trial, the same PETG member that was used in the Example I above, 0.020 inches thick by 6 inches high, distributed by AIN Plastics, Tampa, Fla., was used. To fix the PETG member to the upstanding interior wooden posts of the pullet house, the PETG material was cut into strip members that were each approximately 10 inches long. The member was then bent to form a U-shape so that the member would complementarily engage the exterior surface of the post. A collar was formed by applying two overlapping three-sided members (the U-shaped members) over double beads of spaced adhesive latex caulking to affix the collar. The collar was subsequently held in position next to the post with staples. Additionally, beads of adhesive caulking material were placed at the top and bottom edge of the member at each corner formed in the member. The collar was applied to roughened interior posts, minimally cleaned by brushing and sweeping, having an accumulated covering of food dust with admixtures of splattered manure, and to "clean" posts, which were typically located near the ends of the building.

In this and other similar experiments it was determined that neither larvae nor adult lesser mealworms could traverse the upstanding outer surface of the member. As demonstrated in Example I, hundreds of lesser mealworms and hide beetle larvae were observed below the bottom edge of the member on the interior post but no lesser mealwormns were observed on the interior post above the applied insect barrier systems. The crawling insects could not adequately grasp the surface of the PETG member.

It was also demonstrated in this Example that the insect barrier system retained its effectiveness upon the shrinking of wooden posts as the adhesive caulking material located at the comers of the members and between the inner surface of the members and the exterior surface of the interior post was sufficiently flexible to allow for the shrinking of the post and to maintain a sufficient obstruction to the passage of the larvae and adult beetles underneath the insect barrier. Thus, it appears that the insect barrier system of this Example successfully precluded the larvae from reaching the vulnerable support and associated structures and contained the crawling insects within the pullet house for beneficial reduction of fly populations.

Example III

In a first laboratory trial, a polyvinylchloride (PVC) sheet material with a self adhesive backing was used to form the member. To affix the insect barrier system of this example to the upstanding interior posts of the pullet house, the sheet was cut into members in the form of strips that were sized to complementarily surround the exterior surface of the interior post. The release cover of the adhesive backing was removed and the member was wrapped around the interior post and secured into place. No other fastener, affixing means, or obstruction means was applied.

In this experiment it was determined that the crawling insects were unable to traverse the upstanding outer surface of the PVC member. However, the self adhesive used with this Example was insufficient to bond the inner surface of the member to the exterior surface of the post to the degree necessary to prevent the passage of the crawling insects underneath the insect barrier. Due to the nature of the adhesive, no imperviable obstructive barrier was formed that would have prevented the transit of the insects via the exterior surface of the post (underneath the member) to the structure of the building. Thus, it appears that the insect barrier system of this Example, due to the poor adhesive used, failed to precluded the crawling insects from reaching the vulnerable support and associated structures of the building.

Example IV

In a second laboratory trial, a PETG film (0.020 inches thick), distributed by AIN Plastics, Tampa, Fla., and a PVC film (0.010 inches thick) purchased from Falkner Plastics, Gainsville, Fla., were used as the materials to form the shields of the insect barrier system. To affix the insect barrier system to upstanding posts, each sheet was first cut and bent into the shield of the present invention. Each sheet had a sleeve aperture sized to complementarily engage the exterior surface of the post. The insect barrier system was formed by forming each shield around the periphery of the posts over two beads of latex adhesive caulk and subsequently holding the shield to the post with staples. Additional latex adhesive caulk was placed between the shield and the exterior surface of the posts at each corner of the sleeve aperture of the shield.

Each post having a single affixed shield was placed vertically into a large pan containing a large quantity of lesser mealworms and hide beetle larvae. In this and other similar experiments, it was determined that the larvae climbed the posts readily but were unable to traverse the outer surface of the shields of this example. Thus, it appears that the insect barrier system of this Example successfully precluded larvae from reaching the portions of the posts above the shields and contained the crawling insects within the large pan.

Example V

In a third field trial, two collection bodies were incorporated into the insect barrier system protecting the interior of a building from crawling insect infestation. Each collection body was made from a PETG strip, 0.020 inches thick by 6 inches high, distributed by AIN Plastics, Tampa, Fla. The insect barrier system of the present example had members, as described in Example I above, applied lengthwise to the top of the upstanding surface of the sixteen inch high cement interior retaining wall. One collection body was connected to the end of a member at one end of the building and the other collection body was connected to the end of another member applied to the opposite side of the building. Double beads of adhesive caulking were applied to the body mounting surfaces of the collection bodies and the bodies were positioned with respect the members so that the body outer surface and the outer surface of the member presented a continuous barrier to the crawling insects.

In this and other similar experiments it was determined that neither larvae nor adult lesser mealworms or hide beetles could traverse the upstanding body outer surface of the collection body and the outer surface of the member. Hundreds of crawling insects were observed below the bottom edge of the member on the interior walls but no crawling insects were observed on the protected interior walls above the applied insect barrier system. It was also observed that migrating insects tended to enter the passage opening (in an apparent effort to reach the portions of the interior walls above the insect barrier system) and traverse the defined traversable path to the top end of the passage opening. The insects tended to either knock each other off the exterior surface of the wall due to crowding that occurred at the top end of the passage opening or lose traction while attempting to traverse the body outer surface near the top end of the passage opening. The insects that fell landed on the projecting platform 80 of the collection body and subsequently slid of the platform 80 and fell into a bucket that was placed on the ground below the projecting platform 80 of the collection body. Each week, thousands of crawling insects were observed in each bucket.

While the invention has been described with respect to specific preferred embodiments for purposes of example, many modifications and variations are possible and it is not intended to limit the invention except as defined in the following claims.

What is claimed is:

1. An insect barrier system to prevent the passage of crawling insects upon the exterior surface of an object comprising:
    (a) a member having an inner surface and an opposed outer surface, the inner surface of the member being adapted to be disposed adjacent to the exterior surface of the object, the outer surface having a low coefficient of friction for preventing said crawling insects from obtaining sufficient traction therewith to cross said outer surface; wherein said outer surface of the member is a non-fluorinated polymer selected from the group consisting of polyethylene terephthalate, polyvinyl chloride, polyethylene, and polypropylene, wherein said outer surface has a coefficient of friction from about $0.05-\mu 0.45\mu$; and
    (b) means for affixing the member to the exterior surface of the object.

2. The insect barrier system of claim 1, wherein the member is sized and shaped to complementarily engage the exterior surface of the object so that the inner surface of the member overlies the exterior surface of the object when the member is affixed to the object.

3. The insect barrier system of claim 2, wherein the member has a top edge and an opposed bottom edge wherein the inner surface of the member has a plurality of scores extending from the top edge to the bottom edge of the member so that the member may be altered to a desired shape so that the inner surface of the member complementarily overlies the exterior surface of the object when the member is affixed to the object.

4. The insect barrier system of claim 2, wherein the member circumscribes a portion of the exterior surface of the object when the member is affixed to the object.

5. The insect barrier system of claim 1, wherein the affixing means comprises a layer of adhesive disposed on the inner surface of the member for securing the member to the exterior surface of the object.

6. The insect barrier system of claim 1, wherein the affixing means comprises at least one bead of adhesive disposed between a selected portion of the inner surface of the member and a selected portion of the exterior surface of the object for securing the member to the exterior surface of the object when the member is affixed to the object.

7. The insect barrier of claim 1, wherein said crawling insects are darkling beetles or hide beetles.

8. A method for at least reducing access of crawling insects to an object comprising applying to an object a length of a member having an inner surface and an opposed outer surface, the inner surface being adapted to be disposed adjacent to the exterior surface of the object, the outer surface of the member having a low coefficient of friction to prevent insects from grasping the outer surface of the member and traversing the outer surface of said member; wherein said outer surface of said member is a polymer selected from the group consisting of polyethylene terephthalate, polyvinyl chloride, polyethylene, and polypropylene wherein said outer surface has a coefficient of friction from about $0.05$–$\mu 0.45\mu$.

9. The method of claim 8, wherein said applying includes applying adhesive between a desired portion of the exterior surface of the object and a desired portion of the inner surface of the member so that the member is affixed to the object and the area between the desired portion of the exterior surface of the object and the desired portion of the inner surface of the member is obstructively sealed so that the passage of insects on the exterior surface of the object and underneath the inner surface of the member is prevented.

10. The method of claim 9, wherein the step of applying the adhesive comprises applying at least one bead of adhesive to the desired portion of the exterior surface of the object upon which the member will be affixed.

11. The method of claim 9, wherein the step of applying the adhesive comprises applying a layer of adhesive to the inner surface of the member.

12. The method of claim 8, wherein said crawling insects are darkling beetles or hide beetles.

* * * * *